(12) United States Patent  
Heo et al.

(10) Patent No.: US 8,384,876 B2  
(45) Date of Patent: Feb. 26, 2013

(54) METHOD OF DETECTING RETICLE ERRORS

(75) Inventors: Jin-seok Heo, Suwon-si (KR); Jin-hong Park, Hwaseong-si (KR); Dae-youp Lee, Gunpo-si (KR); Jeong-ho Yeo, Suwon-si (KR)

(73) Assignee: Samsung Electronics, Co., Ltd., Gyeonggi-Do (KR)

( * ) Notice: Subject to any disclaimer, the term of this patent is extended or adjusted under 35 U.S.C. 154(b) by 830 days.

(21) Appl. No.: 12/458,503

(22) Filed: Jul. 14, 2009

(65) Prior Publication Data

US 2010/0149502 A1 Jun. 17, 2010

(30) Foreign Application Priority Data

Dec. 16, 2008 (KR) .................. 10-2008-0128196

(51) Int. Cl.  
*G03B 27/68* (2006.01)
(52) U.S. Cl. ........................... 355/52; 355/77
(58) Field of Classification Search .......... 355/52, 355/77; 356/237.4, 237.5  
See application file for complete search history.

(56) References Cited

U.S. PATENT DOCUMENTS

| 6,423,977 | B1 * | 7/2002 | Hayasaki et al. | 356/237.5 |
| 7,016,027 | B2 * | 3/2006 | Butt et al. | 356/237.1 |
| 2007/0065732 | A1 * | 3/2007 | Lee et al. | 430/5 |
| 2007/0236691 | A1 * | 10/2007 | Fukuhara et al. | 356/237.6 |

FOREIGN PATENT DOCUMENTS

| JP | 08-146592 | 6/1996 |
| JP | 2003-307465 | 10/2003 |
| JP | 2005-049663 | 2/2005 |
| KR | 10-0604940 | 7/2006 |

* cited by examiner

*Primary Examiner* — Glen Kao  
(74) *Attorney, Agent, or Firm* — Harness, Dickey & Pierce, P.L.C.

(57) ABSTRACT

A method of detecting reticle error may include using an optical source of an exposure unit to cause light to be incident on a reticle installed in the exposure unit, and detecting the reticle error using only $0^{th}$ diffraction light from among diffraction lights transmitted through the reticle. A method of detecting reticle error may include: installing a reticle, including a mask substrate and mask patterns having a critical dimension formed on the mask substrate, in an exposure unit to cause light to be incident on the reticle; exposing a photoresist film disposed on a wafer in the exposure unit using only $0^{th}$ diffraction light from among diffraction lights transmitted through the reticle; developing the exposed photoresist film; and analyzing a thickness change, an image, or the thickness change and image of the developed photoresist film, in order to detect the reticle error at a wafer level.

18 Claims, 12 Drawing Sheets

METHOD OF DETECTING RETICLE ERRORS

PRIORITY STATEMENT

This application claims priority from Korean Patent Application No. 10-2008-0128196, filed on Dec. 16, 2008, in the Korean Intellectual Property Office (KIPO), the entire contents of which are incorporated herein by reference.

BACKGROUND

1. Field

Example embodiments relate to methods of detecting errors (or faults) of reticles used in photolithography performed during manufacturing of a semiconductor device. Also, example embodiments relate to methods of directly detecting errors of reticles from an exposure unit.

2. Description of Related Art

In general, various processes may be required to manufacture semiconductor devices. The processes may be classified into thin film deposition, photolithography, etching, and/or ion implantation. Thin film deposition may be for depositing a thin film on a wafer (a semiconductor substrate), for example, a silicon wafer; photolithography and/or etching may be for forming the deposited thin film in a pattern that may or may not be predetermined; and/or ion implantation may be for implanting impurities into the wafer.

In particular, photolithography may be a process for forming a photoresist film on a thin film deposited on a wafer, and/or exposing and/or developing the photoresist film using an exposure unit and/or a reticle (mask) installed in the exposure unit, thereby forming a photoresist pattern. The exposure unit may include a stepper and/or a scanner. The reticle may refer to a transparent substrate, including a mask pattern (reticle pattern) having a critical dimension (CD) formed thereon, and/or may be an optical element that allows light emitted from the exposure unit to selectively penetrate the photoresist film. The mask pattern having a CD may be transcribed onto the photoresist film by light transmitted through the reticle. The photoresist pattern, having a CD that may be the same as that of the mask pattern, may be formed by developing the photoresist film.

In general photolithography, the CD of the mask pattern formed on the reticle may be different from the CD of the photoresist pattern formed on the wafer. It may be deemed that such a difference in the CD between the mask pattern and the photoresist pattern exists due to an exposure unit error generated in the exposure unit and/or a reticle error generated in the reticle.

However, in a photolithography process for exposing and developing the photoresist film formed on the wafer, it may be hard to clearly classify the error of the exposure unit and/or the reticle error. In other words, it may be hard to clearly detect which elements affect the generation of the reticle error on the wafer. In general, the reticle error may be detected or examined using a reticle inspection tool, but the reticle error generated on the wafer may not be clearly specified. In addition, when the reticle error is detected or examined using the reticle inspection tool, a long time may be needed for the detection or examination.

SUMMARY

Example embodiments may provide methods of directly detecting errors of reticles at a wafer level without using a reticle inspection tool.

According to example embodiments, a method of detecting reticle error may include: using an optical source of an exposure unit to cause light to be incident on a reticle installed in the exposure unit; and/or detecting the reticle error using only $0^{th}$ diffraction light from among diffraction lights transmitted through the reticle.

According to example embodiments a method of detecting reticle error may include: installing a reticle, including a mask substrate and mask patterns having a critical dimension (CD) formed on the mask substrate, in an exposure unit to cause light to be incident on the reticle installed in the exposure unit; exposing a photoresist film disposed on a wafer in the exposure unit using only $0^{th}$ diffraction light from among diffraction lights transmitted through the reticle; developing the exposed photoresist film; and/or analyzing a thickness change of the developed photoresist film, analyzing an image of the developed photoresist film, or analyzing the thickness change and the image of the developed photoresist film, in order to detect the reticle error at a wafer level.

According to example embodiments, a method of detecting reticle error may include: installing a standard reticle, including a first mask substrate and first mask patterns having a first critical dimension (CD) formed on the first mask substrate, in an exposure unit to cause light to be incident on the standard reticle installed in the exposure unit; exposing a first photoresist film disposed on a first wafer using only $0^{th}$ diffraction light from among diffraction lights transmitted through the standard reticle; developing the exposed first photoresist film; measuring a thickness change and an image of the developed first photoresist film; installing an experimental reticle, including a second mask substrate and second mask patterns having a second CD formed on the second mask substrate, in the exposure unit to cause light to be incident on the experimental reticle installed in the exposure unit; exposing a second photoresist film disposed on a second wafer using only $0^{th}$ diffraction light from among diffraction lights transmitted through the experimental reticle; developing the exposed second photoresist film; measuring a thickness change and an image of the developed second photoresist film; and/or comparing the thickness change and the image of the first photoresist film to the thickness change and the image of the second photoresist film, in order to detect a reticle error of the experimental reticle at a wafer level.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
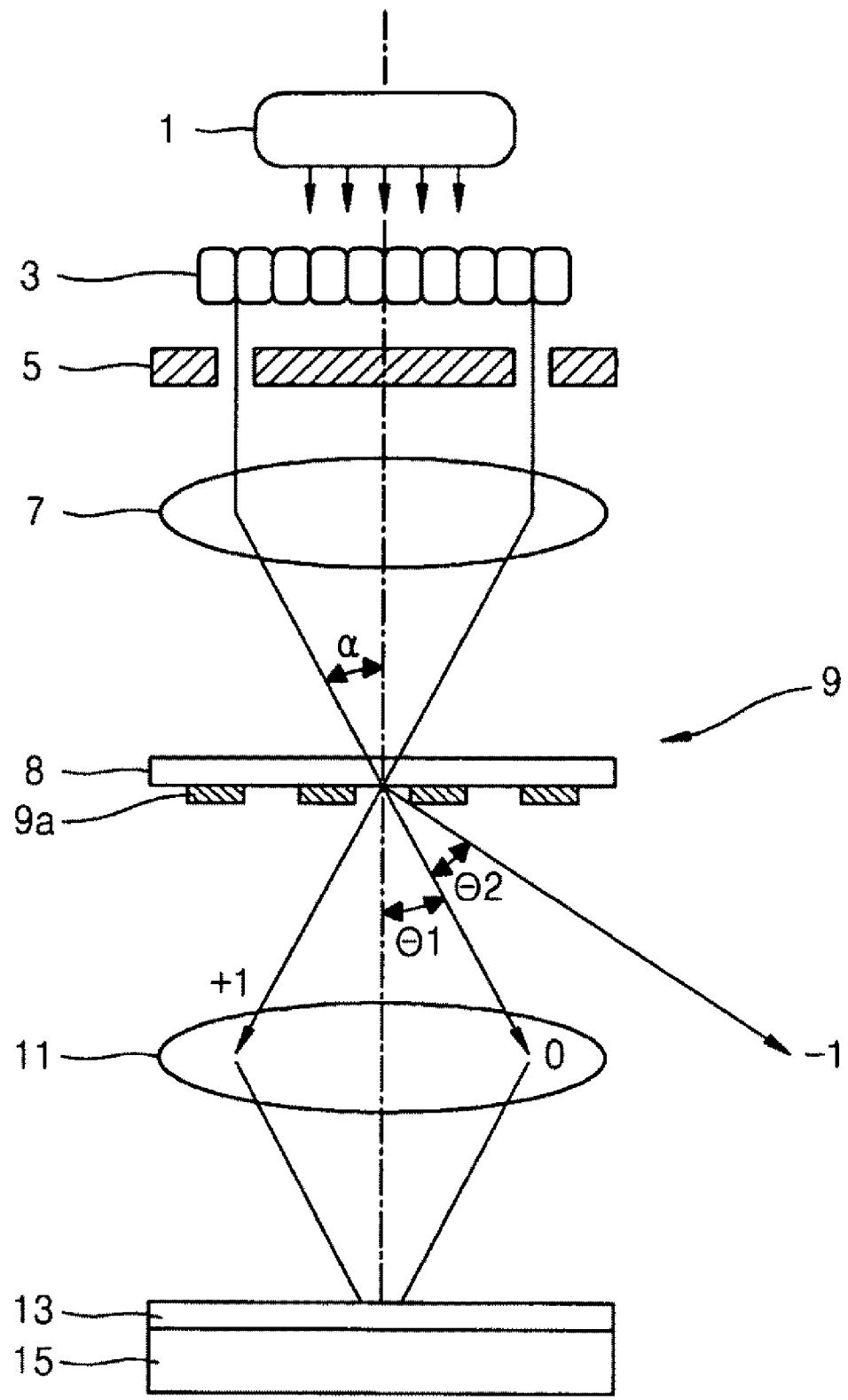
FIG. 1 schematically illustrates an optical path in an exposure unit according to example embodiments employing an illumination meter.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

In example embodiments, a reticle error or a reticle error element, which may be generated on a wafer, may be detected using light in an exposure unit, for example, a stepper or a scanner, that is, only $0^{th}$ order light from among diffraction lights of laser light. In other words, only $0^{th}$ order light from among diffraction lights may be caused to be incident on the reticle using an illumination meter of the exposure unit, and the reticle error generated on the wafer may be detected. Detecting of the reticle error using $0^{th}$ order light from among diffraction lights may be included in the scope of example embodiments.

The reticle described in example embodiments may be a mask applied during the manufacture of various microelectronic devices. Examples of the microelectronic devices may include dynamic random access memory (DRAM), static random access memory (SRAM), semiconductor devices such as flash memory, central processor units (CPU), digital signal processors (DSPs), processors combining a CPU and a digital signal processor (DSP), application specific integrated circuits (ASIC), micro electro mechanical devices (MEM's), optoelectronic devices, and display devices, but are not limited thereto.

$0^{th}$ diffraction light may be used in example embodiments. In order to obtain $0^{th}$ diffraction light, an illumination meter may be selected and/or installed in the exposure unit according to a pattern of a reticle. Accordingly, if $0^{th}$ diffraction light may be obtained according to the pattern of the reticle, various illumination meters may be used in the exposure unit. The exposure unit that may be used in example embodiments may be, for example, a stepper or a scanner.

For example, in order to obtain $0^{th}$ diffraction light, an off-axis illumination meter may be used in the exposure unit. Use of the off-axis illumination meter may be one of the modified illumination methods for improving resolution. Various other illumination meters may be used in the exposure unit, in addition to the off-axis illumination meter, in order to obtain $0^{th}$ diffraction light. However, for convenience of description, the off-axis illumination meter is used in the description of example embodiments.

Figure 2:
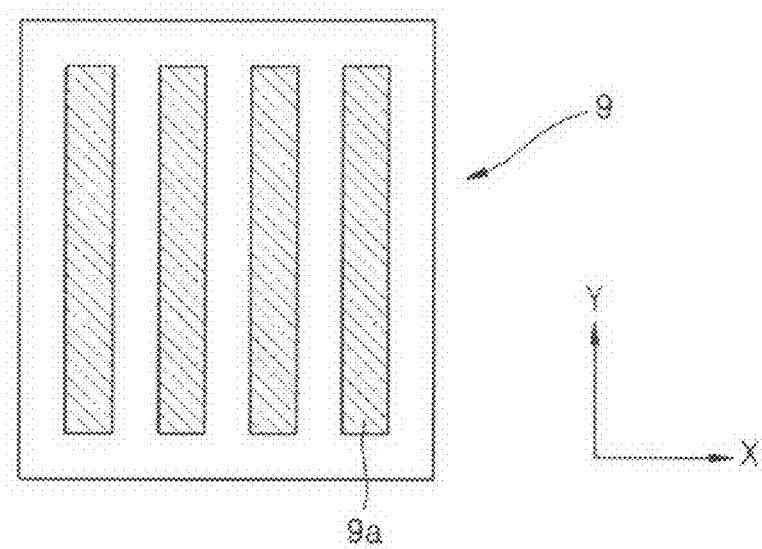
FIG. 2 is a plan view of a reticle illustrated in FIG. 1.
Figure 3:
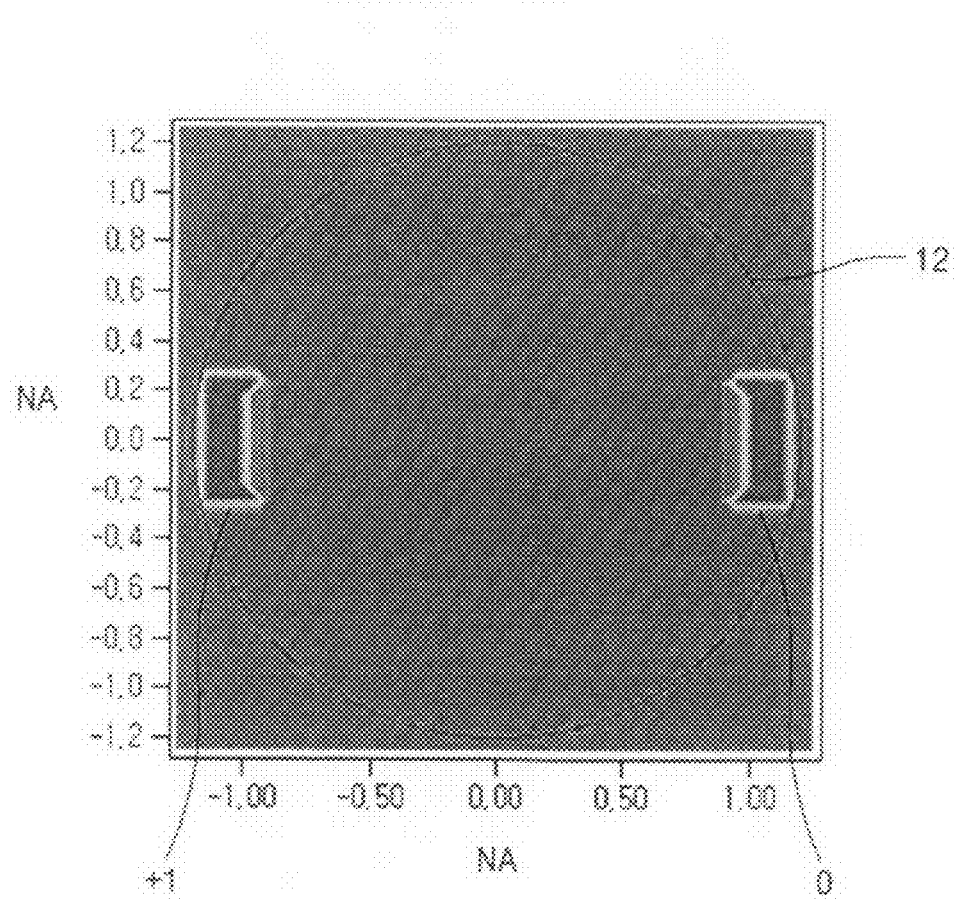
FIG. 3 illustrates simulation of an illumination form generated by the reticle illustrated in FIG. 1.

FIG. 1 schematically illustrates an optical path in an exposure unit according to example embodiments employing an illumination meter 5, FIG. 2 is a plan view of a reticle 9 illustrated in FIG. 1, and FIG. 3 illustrates simulation of an illumination form generated by the reticle 9 illustrated in FIG. 1.

More specifically, the exposure unit may include an illumination device formed of an optical source 1, a fly-eye lens 3, a condenser lens 7, and/or the illumination meter 5, for example, an off-axis illumination meter. The illumination meter 5 may be a dipole illumination meter, in which a light transmission region is disposed in an X-axis direction, since the dipole illumination meter may improve resolution of a mask pattern (reticle pattern) in a Y-axis direction.

Light emitted from the optical source 1 may be partially limited by the fly-eye lens 3 and the illumination meter 5. Since the illumination meter 5 may be eccentric from an optical axis, light passing through the illumination meter 5 may pass through the condenser lens 7 and/or may have an off-axis angle $\alpha$ that may or may not be predetermined, thereby illuminating the reticle 9. Due to the illumination meter 5, only inclined portions (off-axis portions) of light may reach the reticle 9. The reticle 9 may be formed of a mask substrate 8 and/or mask patterns (reticle patterns) 9a having a critical dimension (CD) formed on the mask substrate 8. The reticle 9 illustrated in FIG. 2 may include lines in a Y-axis direction and/or spaced mask patterns 9a.

Light illuminated onto the reticle 9 may be diffracted by the mask patterns 9a. $0^{th}$ diffraction light from among diffraction lights may be diffracted by a diffraction angle $\theta 1$ with respect to the optical axis, a pitch of the mask patterns 9a may be small, and/or a numerical aperture (NA) of a projection lens 11 may be greater than sin ($\theta 2$). Thus, light diffracted by −1st or a higher order may not enter the projection lens 11. Accordingly, only $0^{th}$ order and/or first order diffracted lights may interfere on a photoresist film 13 disposed on a wafer 15 and thereby, an image may be formed on the photoresist film 13.

Such an illumination form is clearly described with reference to FIG. 3, in which $0^{th}$ diffraction light (represented by 0) and first diffraction light (represented by +1) are illustrated. As such, when $0^{th}$ diffraction light and first diffraction light are represented, it may be easy to form the mask patterns 9a to be a photoresist pattern on the photoresist film 13 disposed on the wafer 15. In FIG. 3, a circle 12 may denote a size of the projection lens 11 and/or NA may denote a numerical aperture of the projection lens 11.

Figure 4:
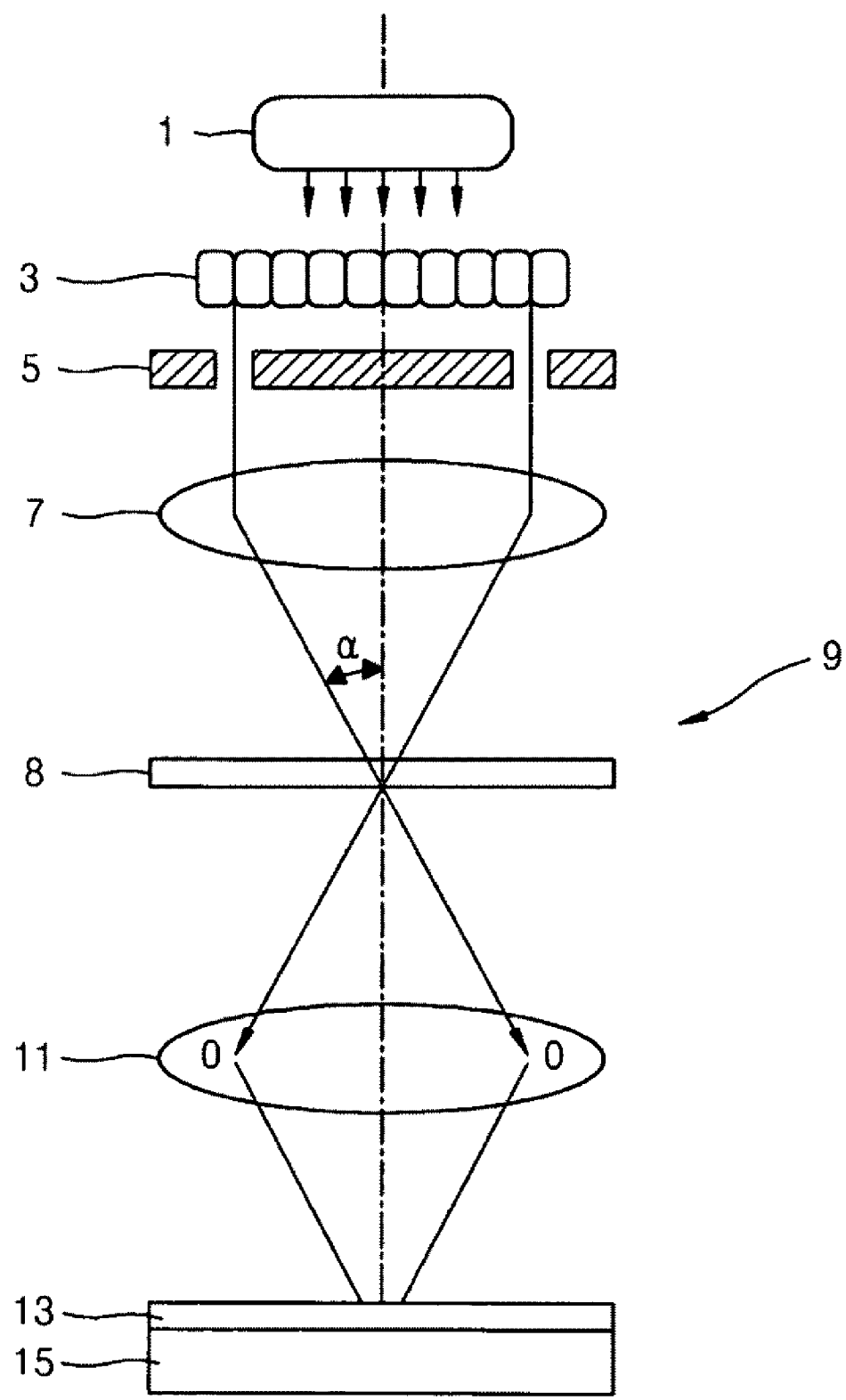
FIG. 4 schematically illustrates an optical path in an exposure unit according to example embodiments employing an illumination meter.
Figure 5:
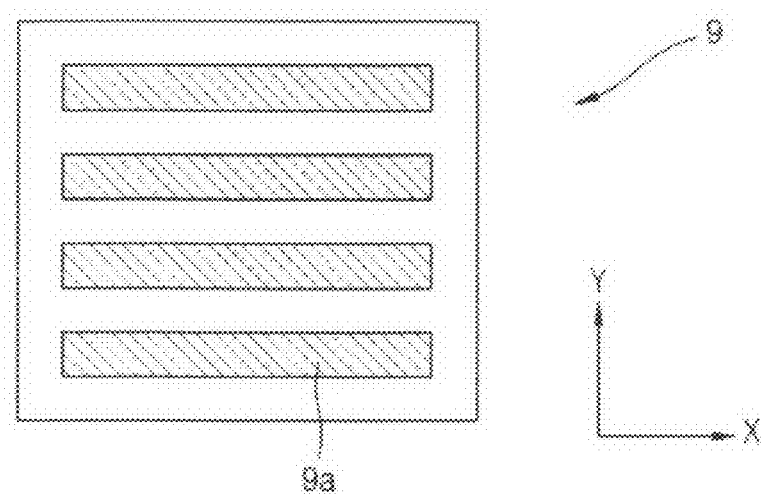
FIG. 5 is a plan view of a reticle illustrated in FIG. 4.
Figure 6:
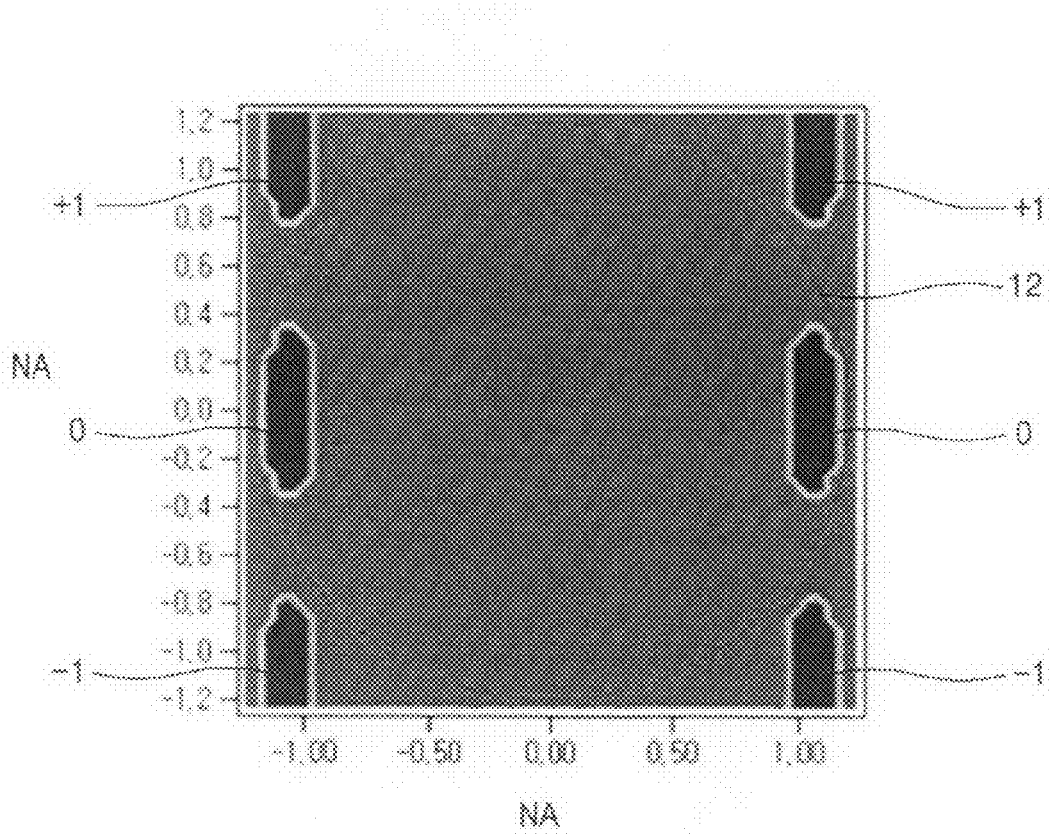
FIG. 6 illustrates a simulation of an illumination form generated by reticle illustrated in FIG. 4.
Figure 7A:
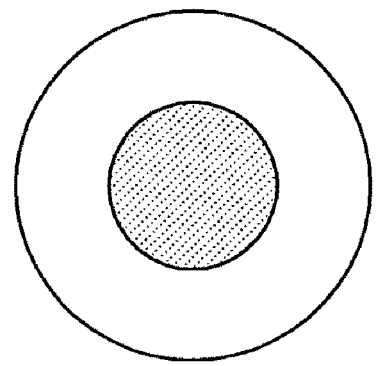
FIGS. 7A through 7F illustrate various examples of an illumination meter capable of being employed in an exposure unit according to example embodiments.
Figure 7B:
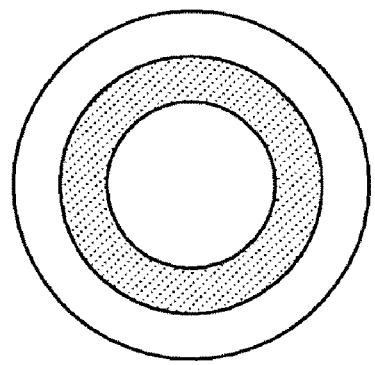
Figure 7C:
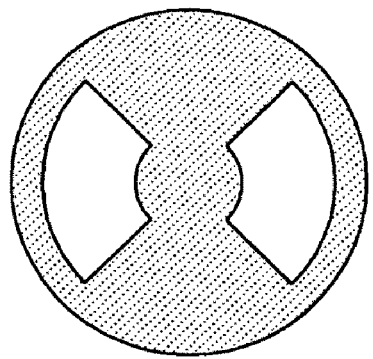
Figure 7D:
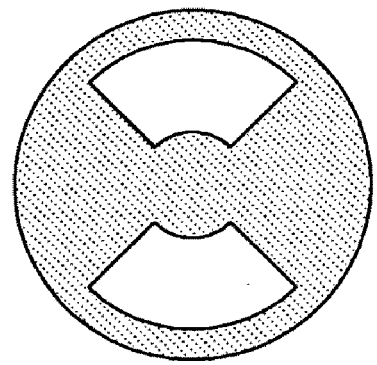
Figure 7E:
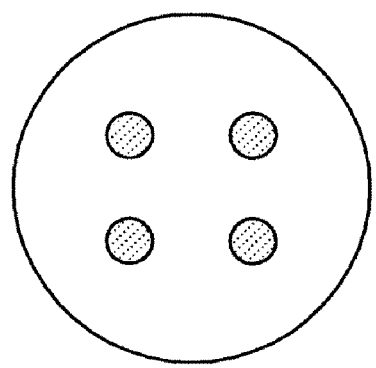
Figure 7F:
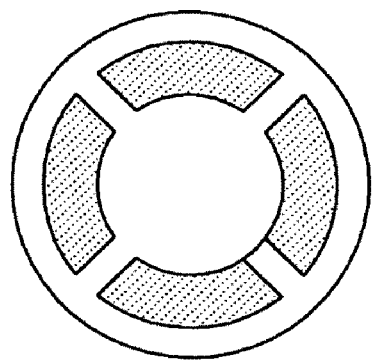

FIG. 4 schematically illustrates an optical path in an exposure unit according to example embodiments employing an illumination meter 5, FIG. 5 is a plan view of a reticle 9 illustrated in FIG. 4, and FIG. 6 illustrates a simulation of an illumination form generated by the reticle 9 illustrated in FIG. 4.

More specifically, FIGS. 4 and 5 are the same as FIGS. 1 and 2, except that a forming direction of the mask patterns (reticle pattern) 9a formed on the reticle 9 may be different. That is, unlike FIG. 2, the reticle 9 of FIG. 5 may include lines in an X-axis direction and the spaced mask patterns 9a. Similarly to the illumination meter 5 of FIG. 1, the illumination meter 5 of FIG. 4 may be a dipole illumination meter, in which a light transmission region is disposed in an X-axis direction.

Then, light illuminated onto the reticle 9 may be diffracted by the mask patterns 9a. Only $0^{th}$ diffraction light from among diffraction light may enter the projection lens 11, and light diffracted by +1st, −1st, and/or a higher order may not enter the projection lens 11. Accordingly, $0^{th}$ order diffracted light, that is, $0^{th}$ diffraction light (represented by 0), only may reach the photoresist film 13 disposed on the wafer 15.

Figure 12:
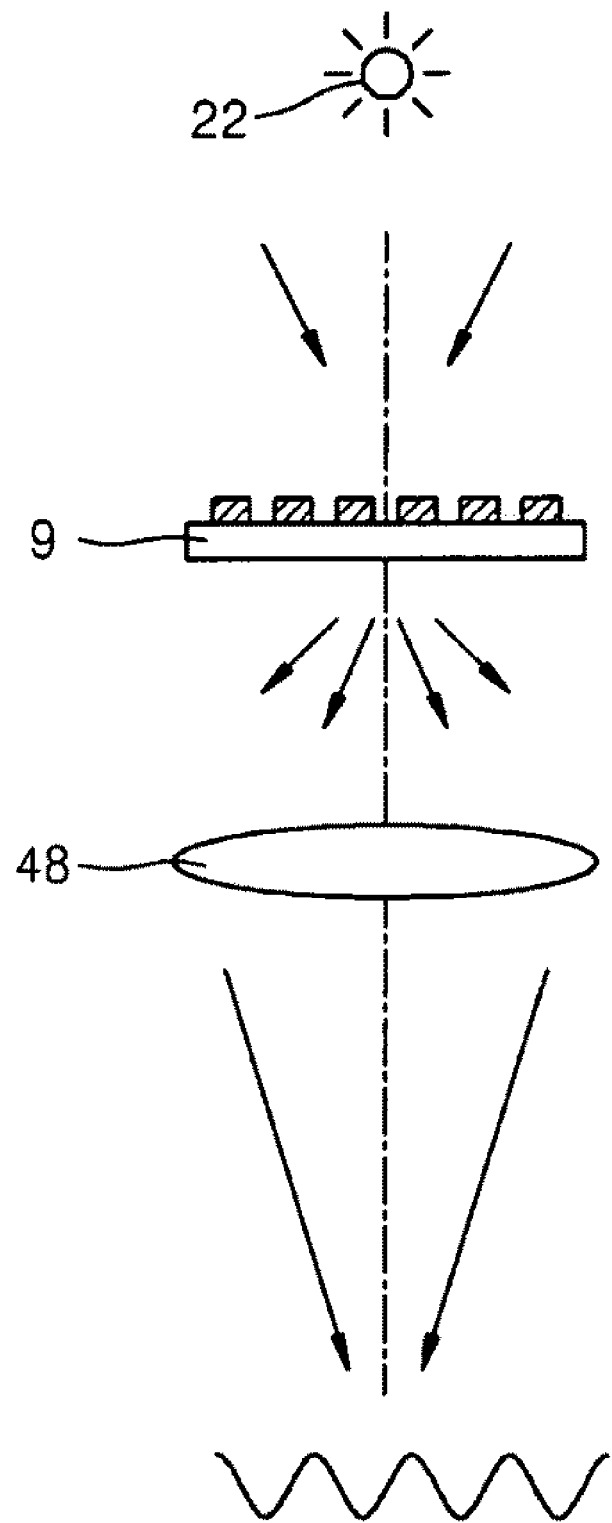
FIG. 12 schematically illustrates a method of measuring a reticle error using the reticle inspection tool of FIG. 11.

Such an illumination form is clearly described in FIG. 6, in which only $0^{th}$ diffraction light is illustrated. In FIG. 12, the circle 12 may denote a size of the projection lens 11 and/or NA may denote a numerical aperture of the projection lens 11.

When only $0^{th}$ diffraction light is incident on the photoresist film 13 disposed on the wafer 15, a diffraction pattern may not be formed. After a developing process, the thickness of the photoresist film 13 may be linearly changed according to the intensity of exposure dose, which will be described later.

FIGS. 7A through 7F illustrate various examples of the illumination meter 5 capable of being employed in an exposure unit according to example embodiments.

More specifically, example embodiments may be related to detecting the reticle error using $0^{th}$ diffraction light from among diffraction lights transmitted through the reticle in the exposure unit. Accordingly, as illustrated in FIG. 4, the dipole illumination meter, in which a light transmission region may be disposed in an X-axis direction, may be used as the illumination meter 5 and, as illustrated in FIG. 5, the reticle 9, on which lines in an X-axis direction and the spaced mask patterns 9a are formed, may be used.

However, the form of the mask patterns 9a formed on the reticle 9 may vary and thus, the illumination meter 5 may be formed in various ways. Examples of the illumination meter 5 are as follows. The illumination meter 5 in FIGS. 7A, 7B, 7C, 7D, 7E, and 7F may be, respectively, a circular illumination meter, an annular illumination meter, a dipole illumination meter in an X-axis direction, a dipole illumination meter in a Y-axis direction, a quadrupole illumination meter, and/or a crosspole illumination meter.

In example embodiments, any one of the circular illumination meter, the dipole illumination meter, the annular illumination meter, the quadrupole illumination meter, the crosspole illumination meter, and a combination thereof may be used. In FIGS. 7A through 7F, the portion which is not hatched is a light transmission region. The shape of the light transmission region in FIGS. 7A through 7F may vary according to the mask patterns (reticle patterns) 9a.

Figure 8:
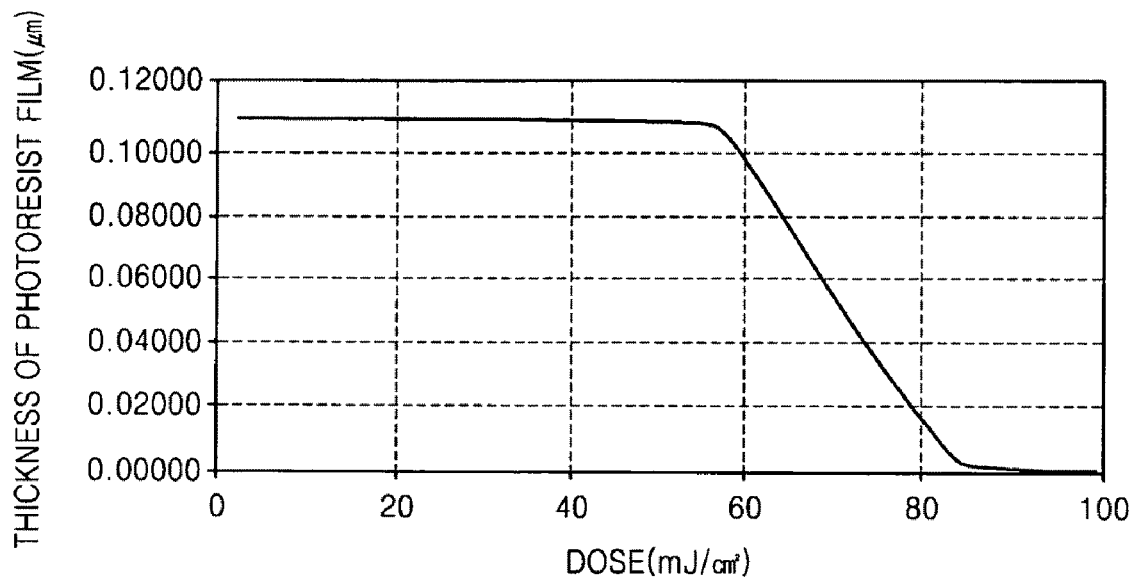
FIG. 8 is a graph illustrating changes in thickness of a photoresist film according to the exposure dose to which the photoresist film on a wafer is exposed, when the photoresist film is exposed and developed using an exposure unit employing the illumination meter and the reticle illustrated in FIGS. 4 and 5.

FIG. 8 is a graph illustrating changes in thickness of the photoresist film 13 according to exposure dose, when the photoresist film 13 on the wafer 15 may be exposed and developed using the exposure unit employing the illumination meter 5 and the reticle 9 illustrated in FIGS. 4 and 5.

More specifically, as described above, the optical source 1 included in the exposure unit may be used to cause light to be incident on the reticle 9 in the exposure unit, and/or only light diffracted by $0^{th}$ order may reach the photoresist film 13 on the wafer 15 due to the exposure unit employing the specific illumination meter and/or the reticle using the specific mask patterns.

When only $0^{th}$ diffraction light reaches the photoresist film 13, a diffraction pattern may not be formed and/or after a developing process, a thickness of the photoresist film 13 may be linearly changed according to exposure dose, as illustrated in FIG. 8. The thickness changes and/or images of the photoresist film 13 may be quickly obtained by a charge coupled device (CCD) installed in a general defect inspection tool. The images may be represented by colors, for example, red, green, and blue.

Consequently, when the reticle error is generated during exposing, the thickness changes and/or the images of the photoresist film 13 may be generated according to exposure dose, and after a developing process, may differ from thickness changes and/or images resulting from exposing using a normal reticle. Accordingly, in example embodiments, the defect inspection tool may be used to quickly and conveniently detect the reticle error.

Figure 9:
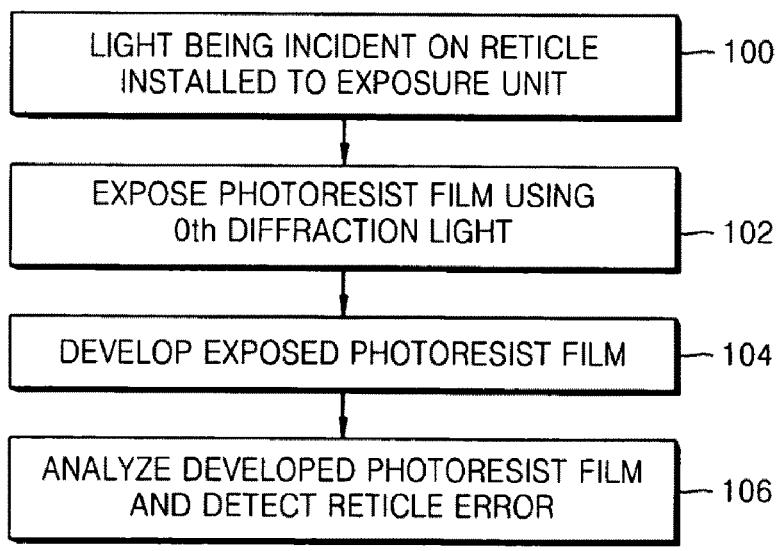
FIG. 9 is a flowchart illustrating a method of detecting a reticle error according to example embodiments.

FIG. 9 is a flowchart illustrating a method of detecting the reticle error according to example embodiments.

More specifically, the method of detecting the reticle error may include using the optical source 1 of the exposure unit to cause light to be incident on the reticle 9 included in the exposure unit and/or to detect the reticle error using $0^{th}$ diffraction light from among the diffraction lights transmitted through the reticle 9.

In more detail, the reticle formed of the mask substrate and/or the mask patterns having a CD formed on the mask substrate as illustrated in FIGS. 4 and 5 may be installed in the exposure unit, and light may be incident on the reticle installed to the exposure unit, in operation 100.

Then, the exposure unit illustrated in FIG. 4 may be used and/or the photoresist film disposed on the wafer may be exposed to only $0^{th}$ diffraction light from among the diffraction lights transmitted through the reticle 9, in operation 102. As described above, $0^{th}$ diffraction light may be formed by introducing a specific illumination meter according to the pattern of the reticle 9 in the exposure unit. Next, the exposed photoresist film may be developed, in operation 104.

The thickness changes and/or images of the developed photoresist film may be analyzed to detect the reticle error at a wafer level, in operation 106. The difference in the thickness changes and/or images of the developed photoresist film may be determined using a defect inspection tool.

Figure 10:
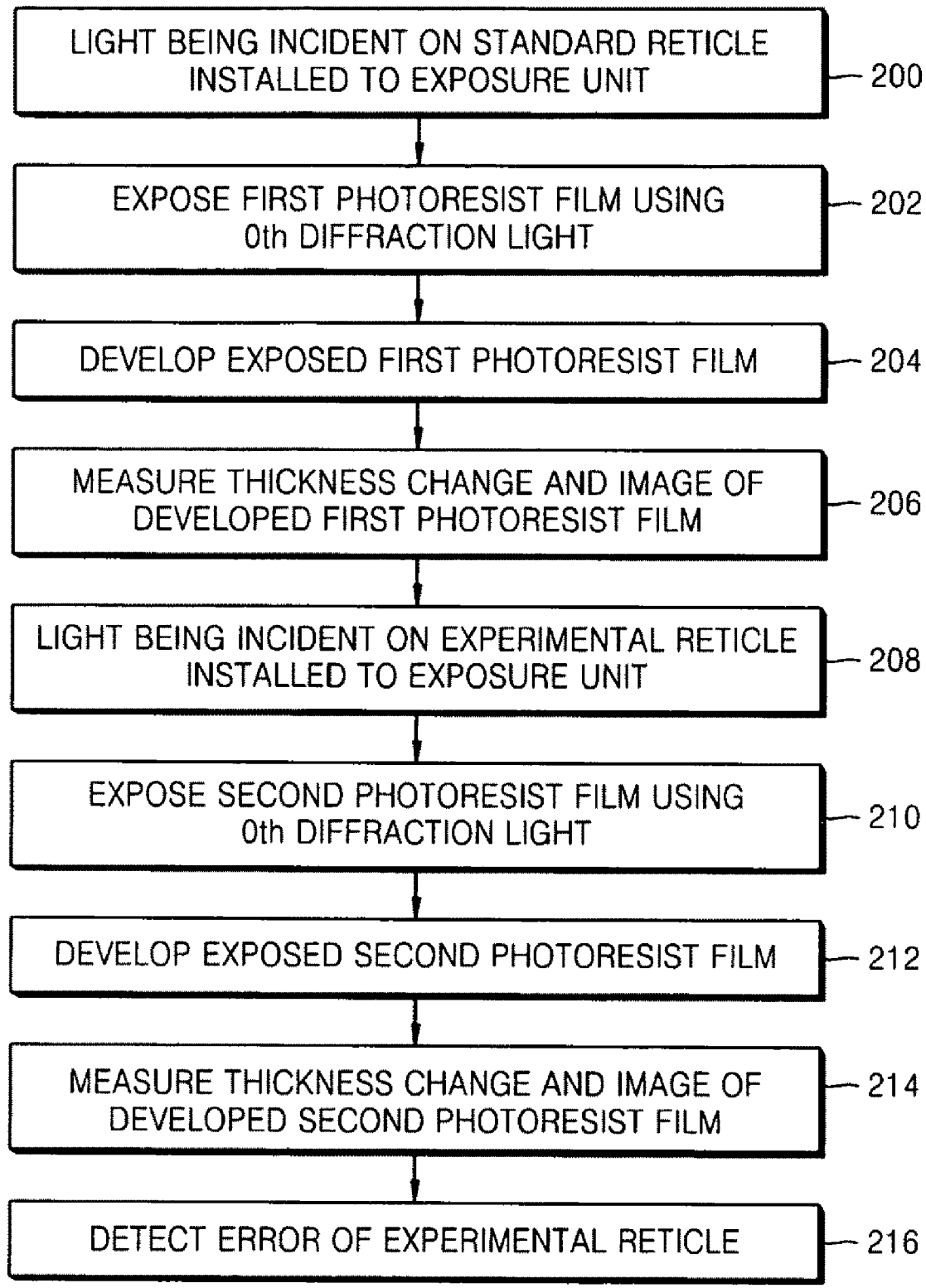
FIG. 10 is a flowchart illustrating a method of detecting a reticle error according to example embodiments.

FIG. 10 is a flowchart illustrating a method of detecting a reticle error according to example embodiments.

First, a standard reticle, which does not have the reticle error, may be exposed and developed using $0^{th}$ diffraction light in the exposure unit as illustrated in FIG. 4, and the thickness changes and/or images of the photoresist film may be measured. More specifically, the standard reticle formed of the mask substrate and/or the mask patterns having a CD formed on the mask substrate may be installed in the exposure unit, and/or light may be incident on the standard reticle installed in the exposure unit, in operation 200.

A first photoresist film on a first wafer may be exposed to only $0^{th}$ diffraction light from among the diffraction lights transmitted through the standard reticle, in operation 202. The exposed first photoresist film may be developed, in operation 204. The thickness changes and/or images of the developed first photoresist film may be measured, in operation 206.

Next, an experimental reticle, which has the reticle error, may be exposed and/or developed using $0^{th}$ diffraction light in the exposure unit as illustrated in FIG. 4, and the thickness changes and/or images of the photoresist film may be measured. More specifically, the experimental reticle may be formed of the mask substrate and the mask patterns having a CD formed on the mask substrate, and/or light may be incident on the experimental reticle, in operation 208. A second photoresist film on a second wafer may be exposed to only $0^{th}$ diffraction light from among the diffraction lights transmitted through the experimental reticle, in operation 210. The exposed second photoresist film may be developed, in operation 212. The thickness changes and/or images of the developed second photoresist film may be measured, in operation 214.

The thickness changes and/or the images of the first photoresist film and/or the second photoresist film may be compared to each other to detect errors of the experimental reticle at a wafer level, in operation 216. The reticle errors may be different in terms of the size of CD and/or the thickness of the mask patterns of the experimental reticle, compared with those of the standard reticle.

Hereinafter, a method of measuring the reticle errors according to example embodiments and a method of measuring the reticle error using a reticle inspection tool are compared with reference to the drawings.

Figure 11:
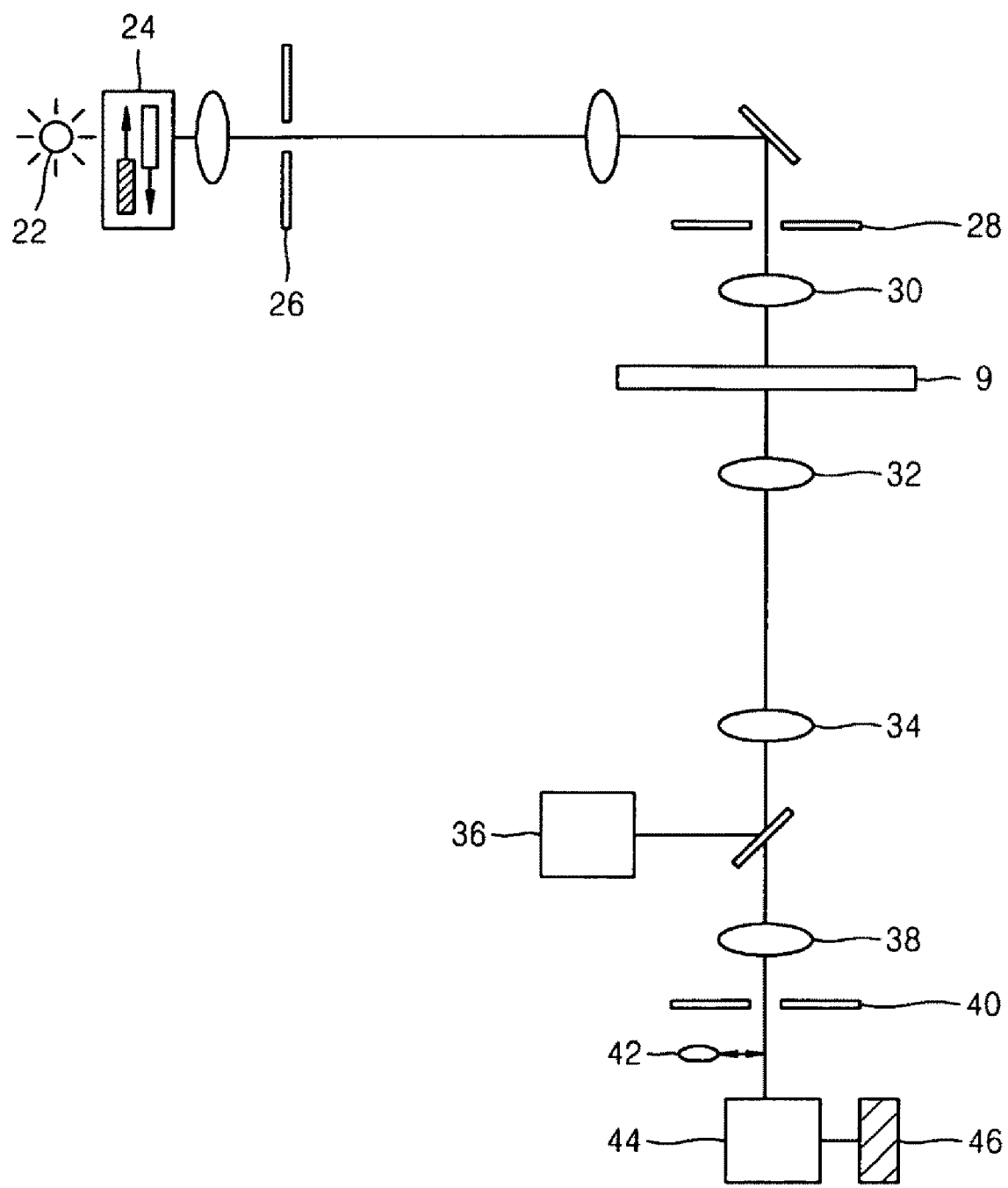
FIG. 11 schematically illustrates comparison between a method of measuring a reticle error using a reticle inspection tool and a method of measuring a reticle error according to example embodiments.

FIG. 11 schematically illustrates comparison between a method of measuring a reticle error using a reticle inspection tool and a method of measuring a reticle error according to example embodiments.

More specifically, the reticle inspection tool may measure an aerial image. The reticle inspection tool may include an optical source 22, for example, a deep ultraviolet (DUV) or an i-line optical source, an electric filter 24 having a filter matched with wavelength of light incident from the optical source 22, an illumination side aperture 26 controlling NA and/or coherency, a condenser lens 30 concentrating light that has passed through a field stop 28 and sending light the concentrated light through the reticle 9, a charge-coupled device (CCD) camera 44 converting light penetrating the reticle 9 into an electric signal and forming an aerial image, and/or an aerial image measurement system (AIMS) 46 measuring the aerial image.

Light penetrating the reticle 9 may be transmitted to the CCD camera 44 through an objective lens 32, a tube lens 34, a projection lens 38 (e.g., a 7× expansion projection lens), and/or an upper aperture 40. A supplementary lens 42 for checking an NA and/or coherency may be interposed between the upper aperture 40 and the CCD camera 44, and/or a CCD camera 36 for viewing visible light may be installed in the reticle inspection tool for viewing light passing through the objective lens 32 and/or for forming an image in the tube lens 34 using a supplementary output unit (not shown) such as a monitor.

FIG. 12 schematically illustrates a method of measuring the reticle error using the reticle inspection tool of FIG. 11.

More specifically, light generated from the optical source 22 may penetrate the reticle 9 and/or an electric signal may be changed to an aerial image in the CCD camera 44 through a plurality of lens modules 48, thereby measuring the reticle errors. That is, under the same illumination conditions as in an exposing process, the reticle inspection tool may read the aerial image generated after light is incident on the reticle 9 using the CCD camera 44 and/or may measure the reticle errors.

When the reticle errors are measured using the reticle inspection tool, the reticle errors generated in the reticle may be measured by separating the reticle errors from the errors generated on the wafer. However, as described above, several tens of minutes or several hours may be needed for the measurement and/or the errors generated on the wafer may not be accurately estimated.

Figure 13:
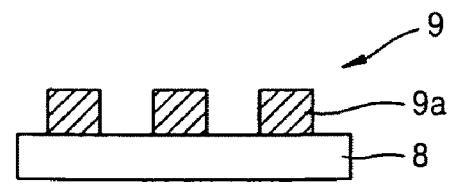
FIG. 13 illustrates a standard reticle that is measured as illustrated in FIGS. 11 and 12.

FIG. 13 illustrates the standard reticle that is measured in FIGS. 11 and 12 and FIGS. 14 and 15 illustrate the experimental reticle having the reticle error measured in FIGS. 11 and 12.

More specifically, the reticle of FIG. 13 may be examined using the reticle inspection tool and as a result, the reticle 9 may be the standard reticle that does not have reticle errors on the mask patterns 9a. The reticle of FIG. 14 may be examined using the reticle inspection tool and as a result, the reticle 9 may be a first experimental reticle having reticle errors in terms of the width of a mask pattern 9b, that is, change in CD size. The reticle 9 of FIG. 15 may be examined using the reticle inspection tool and as a result, the reticle 9 may be a second experimental reticle having reticle errors in terms of the height of a mask pattern 9c.

Figure 14:
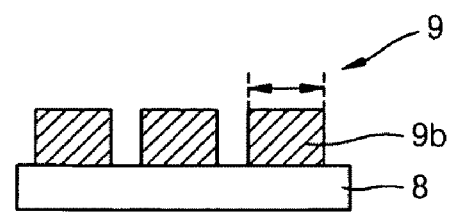
FIGS. 14 and 15 illustrate an experimental reticle having a reticle error measured in FIGS. 11 and 12.
Figure 15:
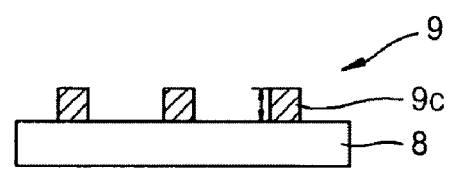
Figure 16:
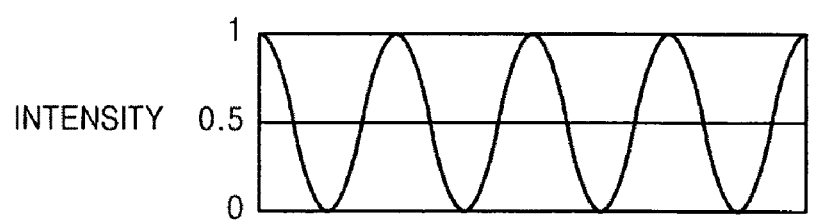
FIG. 16 is a graph illustrating electric intensity when the standard reticle of FIG. 13 is measured using the reticle inspection tool of FIG. 11.
Figure 17:
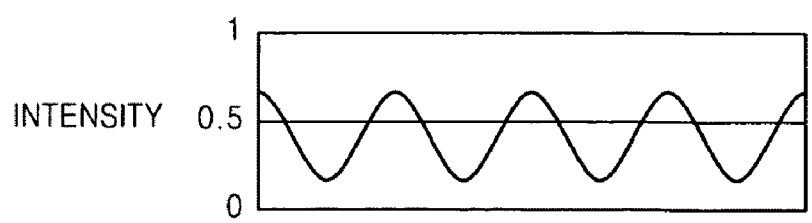
FIG. 17 is a graph illustrating electric intensity when the experimental reticles of FIGS. 14 and 15 are measured using the reticle inspection tool of FIG. 11.

FIG. 16 is a graph illustrating electric intensity when the standard reticle of FIG. 13 is measured using the reticle inspection tool and FIG. 17 is a graph illustrating electric intensity when the experimental reticles of FIGS. 14 and 15 are measured using the reticle inspection tool.

More specifically, when the standard reticle is measured using the reticle inspection tool as illustrated in FIG. 16, a height and/or a width of a waveform, as illustrated in FIG. 16, indicating electric intensity may be uniform. When the experimental reticle is measured using the reticle inspection tool as illustrated in FIG. 17, a height and/or a width of width of a waveform may be respectively lower and larger than those of FIG. 16. As such, a height and a width of a waveform in the standard reticle and the experimental reticle may be compared to each other and/or the reticle errors may be detected.

Figure 18:
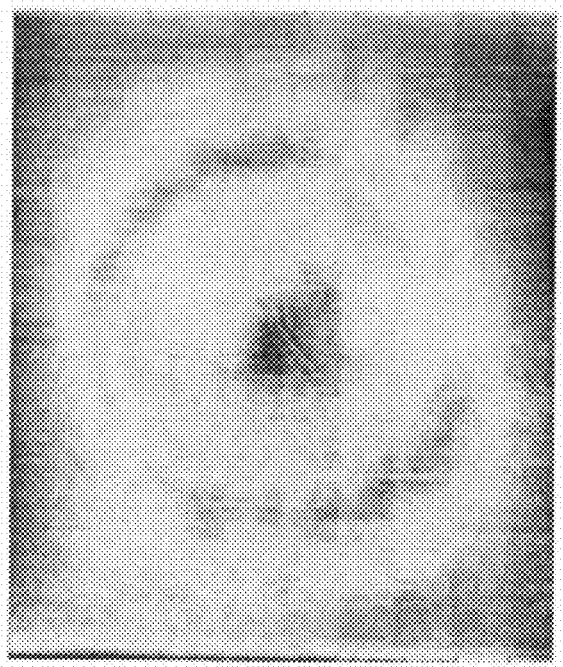
FIGS. 18 and 19 respectively are an aerial image of a comparative example and an inspection image of example embodiments.
Figure 19:
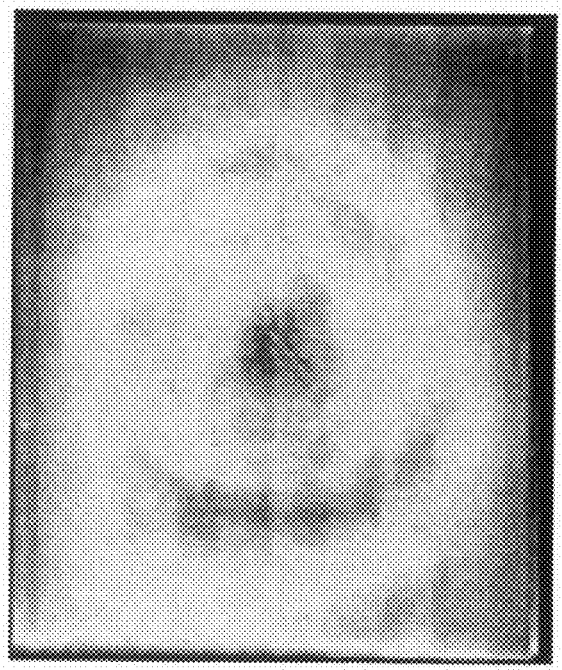

FIGS. 18 and 19 respectively are an aerial image of a comparative example and an inspection image of example embodiments.

More specifically, FIG. 18 illustrates an aerial image obtained after measuring the reticle of FIG. 5 using the reticle inspection tool, and FIG. 19 illustrates an image obtained after the photoresist film is exposed and developed using $0^{th}$ diffraction light transmitted through the reticle and the exposure unit illustrated in FIGS. 4 and 5, and may be measured using the defect inspection tool.

Comparing FIG. 18 with FIG. 19, the same distribution is shown in the shapes of the images and the difference between the two images is an error added from a wafer element. Accordingly, the method of detecting the reticle error according to example embodiments and the method of detecting the reticle error using the reticle inspection tool may obtain the same result.

As described above, light may be caused to be directly incident on the reticle in the exposure unit and/or the reticle error may be detected at a wafer level. According to example embodiments, the wafer may be exposed to only $0^{th}$ diffraction light from among diffraction lights emitted through the reticle and, after a developing process, the thickness changes and/or images of the photoresist film of the exposed wafer may be measured, thereby measuring the reticle error.

In addition, as described above, the reticle error may be quickly detected while obtaining the same result as the method of detecting the reticle error using the reticle inspection tool. Since the reticle error may be detected in a wafer level, the reticle error element, which may be substantially generated during manufacture of semiconductor devices, may be detected.

While example embodiments have been particularly shown and described, it will be understood by those of ordinary skill in the art that various changes in form and details may be made therein without departing from the spirit and scope of the present invention as defined by the following claims.

What is claimed is:

1. A method of detecting reticle error, the method comprising:
   using an optical source of an exposure unit to cause light to be incident on a reticle installed in the exposure unit;
   detecting the reticle error using only $0^{th}$ diffraction light from among diffraction lights transmitted through the reticle; and
   determining the reticle error, after developing a photoresist film disposed on a wafer in the exposure unit, by analyzing thickness changes of the developed photoresist film, by analyzing images of the developed photoresist film, or by analyzing thickness changes and images of the developed photoresist film.

2. The method of claim 1, further comprising:
   obtaining the $0^{th}$ diffraction light using an illumination meter selected according to patterns of the reticle in the exposure unit.

3. The method of claim 1, further comprising:
   obtaining the $0^{th}$ diffraction light using one or more of a circular illumination meter, a dipole illumination meter, an annular illumination meter, a quadrupole illumination meter, and a crosspole illumination meter.

4. The method of claim 1, wherein the thickness changes of the developed photoresist film are analyzed using a defect inspection tool.

5. The method of claim 1, wherein the images of the developed photoresist film are analyzed using a defect inspection tool.

6. A method of detecting reticle error, the method comprising:
   installing a reticle, including a mask substrate and mask patterns having a critical dimension (CD) formed on the mask substrate, in an exposure unit to cause light to be incident on the reticle installed in the exposure unit;
   exposing a photoresist film disposed on a wafer in the exposure unit using only $0^{th}$ diffraction light from among diffraction lights transmitted through the reticle;
   developing the exposed photoresist film; and
   analyzing a thickness change of the developed photoresist film, analyzing an image of the developed photoresist film, or analyzing the thickness change and the image of the developed photoresist film, in order to detect the reticle error at a wafer level.

7. The method of claim 6, further comprising:
   obtaining the $0^{th}$ diffraction light using an illumination meter selected according to the mask patterns of the reticle.

8. The method of claim 6, further comprising:
   obtaining the $0^{th}$ diffraction light using one or more of a circular illumination meter, a dipole illumination meter, an annular illumination meter, a quadrupole illumination meter, and a crosspole illumination meter.

9. The method of claim 6, further comprising:
   analyzing the thickness change of the developed photoresist film using a defect inspection tool.

10. The method of claim 6, further comprising:
    analyzing the image of the developed photoresist film using a defect inspection tool.

11. A method of detecting reticle error, the method comprising:
    installing a standard reticle, including a first mask substrate and first mask patterns having a first critical dimension (CD) formed on the first mask substrate, in an exposure unit to cause light to be incident on the standard reticle installed in the exposure unit;
    exposing a first photoresist film disposed on a first wafer using only $0^{th}$ diffraction light from among diffraction lights transmitted through the standard reticle;
    developing the exposed first photoresist film;
    measuring a thickness change and an image of the developed first photoresist film;
    installing an experimental reticle, including a second mask substrate and second mask patterns having a second CD formed on the second mask substrate, in the exposure unit to cause light to be incident on the experimental reticle installed in the exposure unit;

exposing a second photoresist film disposed on a second wafer using only $0^{th}$ diffraction light from among diffraction lights transmitted through the experimental reticle;

developing the exposed second photoresist film;

measuring a thickness change and an image of the developed second photoresist film; and comparing the thickness change and the image of the developed first photoresist film to the thickness change and the image of the developed second photoresist film, in order to detect a reticle error of the experimental reticle at a wafer level.

12. The method of claim 11, further comprising:

obtaining the $0^{th}$ diffraction light transmitted through the standard reticle using an illumination meter selected according to the first mask patterns of the standard reticle.

13. The method of claim 11, further comprising:

obtaining the $0^{th}$ diffraction light transmitted through the standard reticle using one or more of a circular illumination meter, a dipole illumination meter, an annular illumination meter, a quadrupole illumination meter, and a crosspole illumination meter.

14. The method of claim 11, further comprising:

obtaining the $0^{th}$ diffraction light transmitted through the experimental reticle using an illumination meter selected according to the second mask patterns of the experimental reticle.

15. The method of claim 11, further comprising:

obtaining the $0^{th}$ diffraction light transmitted through the experimental reticle using one or more of a circular illumination meter, a dipole illumination meter, an annular illumination meter, a quadrupole illumination meter, and a crosspole illumination meter.

16. The method of claim 11, further comprising:

comparing the thickness change of the developed first photoresist film to the thickness change of the developed second photoresist film using a defect inspection tool.

17. The method of claim 11, further comprising:

comparing the image of the developed first photoresist film to the image of the developed second photoresist film using a defect inspection tool.

18. The method of claim 11, wherein the first CD is equal to the second CD.

* * * * *